United States Patent [19]
Freudenberg et al.

[11] Patent Number: 6,076,353
[45] Date of Patent: Jun. 20, 2000

[54] COORDINATED CONTROL METHOD FOR TURBOCHARGED DIESEL ENGINES HAVING EXHAUST GAS RECIRCULATION

[75] Inventors: James Scott Freudenberg; Anna Stefanopoulou, both of Ann Arbor; Iiya V. Kolmanovsky, Ypsilanti, all of Mich.

[73] Assignee: Ford Global Technologies, Inc., Dearborn, Mich.

[21] Appl. No.: 09/237,418

[22] Filed: Jan. 26, 1999

[51] Int. Cl.⁷ .................................................. F02M 25/07
[52] U.S. Cl. ........................... 60/605.2; 701/100; 701/108
[58] Field of Search ........................ 60/600, 602, 605.2; 701/100, 108

[56] References Cited

U.S. PATENT DOCUMENTS

| | | |
|---|---|---|
| 4,215,550 | 8/1980 | Dinger et al. ............................ 60/605.2 |
| 4,249,382 | 2/1981 | Evans et al. ............................. 60/605.2 |
| 4,250,711 | 2/1981 | Zehnder .................................. 60/605.2 |
| 5,123,246 | 6/1992 | Younessi . |
| 5,228,292 | 7/1993 | Hanauer . |
| 5,273,019 | 12/1993 | Matthews . |
| 5,505,174 | 4/1996 | Komoriya . |
| 5,520,161 | 5/1996 | Klopp . |
| 5,771,867 | 6/1998 | Amstutz et al. ......................... 60/605.2 |
| 5,778,674 | 7/1998 | Kimura .................................... 60/605.2 |
| 6,003,316 | 12/1999 | Baert et al. ............................. 60/605.2 |

FOREIGN PATENT DOCUMENTS 0 774 574 A1  5/1997  European Pat. Off. .

*Primary Examiner*—Willis R. Wolfe
*Attorney, Agent, or Firm*—Jerome R. Drovillard

[57] ABSTRACT

A method of controlling the airflow into a compression ignition engine having an EGR and a VGT is disclosed. The control strategy includes the steps of determining the engine speed and fueling rate and, retrieving desired values for the intake manifold pressure ($P_1^*$) and compressor mass flow rate ($W_a^*$) as a function of the engine speed and fueling rate wherein the desired values $P_1^*$ and $W_a^*$ correspond to desired values for the air-fuel ratio and burnt gas fraction at each engine operating point. The desired values are then compared against measured values for the intake pressure ($P_1$) and mass airflow ($W_a$) to generate an EGR valve position command and VGT guide vane position command as a function of the weighted sum of the differences between $P_1$ and $P_1^*$, and $W_a$ and $W_a^*$. These position commands are then applied to the EGR valve and turbocharger turbine guide vanes, respectively, to drive the EGR valve and VGT vanes to the respective desired positions.

10 Claims, 2 Drawing Sheets

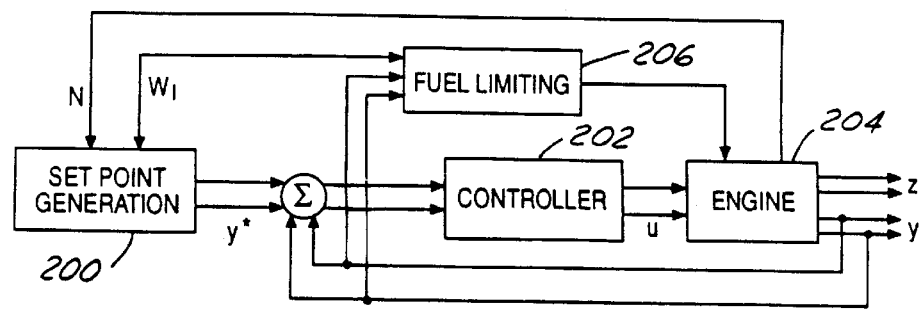
FIG. 2
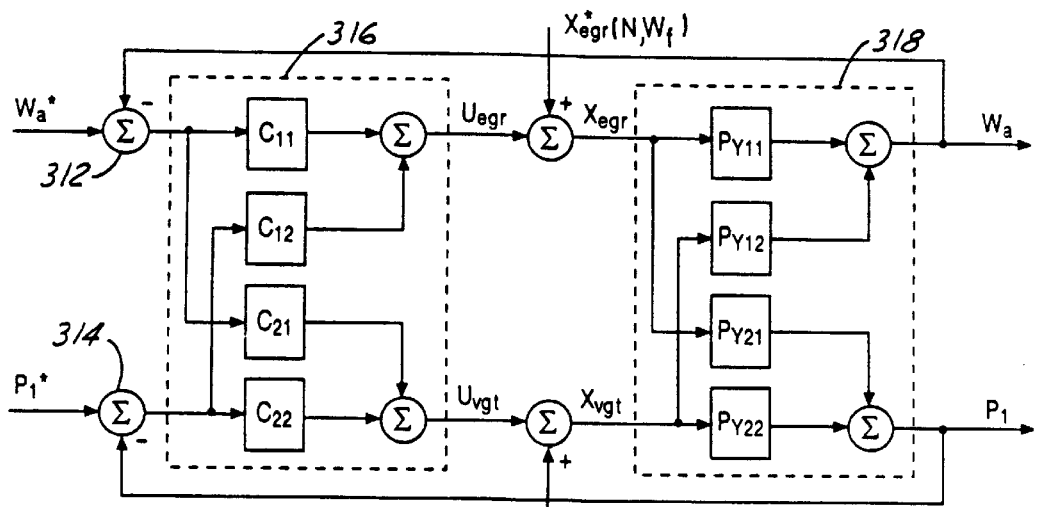
FIG. 3
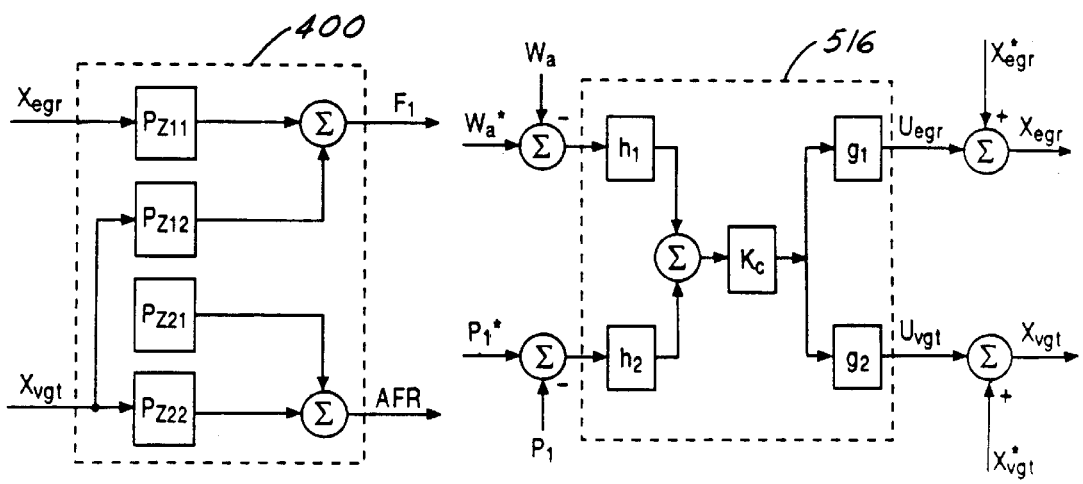
FIG. 4                    FIG. 5 ured by a manifold absolute pressure (MAP) sensor) and compressor mass airflow $W_a$ (measured by a mass airflow sensor

COORDINATED CONTROL METHOD FOR TURBOCHARGED DIESEL ENGINES HAVING EXHAUST GAS RECIRCULATION

TECHNICAL FIELD

This invention relates to turbocharged compression ignition engines having exhaust gas recirculation systems and, more particularly, to methods of controlling the air/fuel ratio and amount of exhaust gas recirculation in diesel engines equipped with variable geometry turbochargers (VGT) and exhaust gas recirculation (EGR) systems.

BACKGROUND OF THE INVENTION

High performance, high speed diesel engines are often equipped with turbochargers to increase power density over a wider engine operating range, and EGR systems to reduce the production of NOx emissions.

Turbochargers use a portion of the exhaust gas energy to increase the mass of the air charge delivered to the engine combustion chambers. The larger mass of air can be burned with a larger quantity of fuel, thereby resulting in increased power and torque as compared to naturally aspirated engines.

A typical turbocharger consists of a compressor and turbine coupled by a common shaft. The exhaust gas drives the turbine which drives the compressor which, in turn, compresses ambient air and directs it into the intake manifold. Variable geometry turbochargers (VGT) allow the intake airflow to be optimized over a range of engine speeds. This is accomplished by changing the angle of the inlet guide vanes on the turbine stator. An optimal position for the inlet guide vanes is determined from a combination of desired torque response, fuel economy, and emissions requirements.

EGR systems are used to reduce NOx emissions by increasing the dilution fraction ($F_1$) in the intake manifold. EGR is typically accomplished with an EGR valve that connects the intake manifold and the exhaust manifold. In the cylinders, the recirculated exhaust gas acts as an inert gas, thus lowering the flame and in-cylinder gas temperature and, hence, decreasing the formation of NOx. On the other hand, the recirculated exhaust gas displaces fresh air and reduces the air-to-fuel ratio (AFR) of the in-cylinder mixture.

Visible smoke can be avoided by maintaining the AFR sufficiently lean, while low NOx (emissions is achieved by keeping $F_1$ sufficiently large. Consequently, the performance of an engine control strategy is evaluated in terms of its ability to regulate AFR and $F_1$. Neither of these performance variables, however, is directly measured. Thus, conventional control schemes generate control signals for EGR and VGT actuators to enforce tracking of set points on measured variables—typically intake manifold pressure $P_1$ (measured by a manifold absolute pressure (MAP) sensor) and compressor mass airflow $W_a$ (measured by a mass airflow sensor (MAF)). The desired set points are typically achieved by independently controlling the VGT to regulate $P_1$ and the EGR to regulate $W_a$. This can result in large actuator effort to enforce the tracking of the measured variables. Consequently, there exists a need for a robust engine control strategy having stable regulation of the AFR and $F_1$ which coordinates the control of the EGR and VGT.

DISCLOSURE OF THE INVENTION

One object of the present invention is to provide an improved compression ignition engine control strategy.

Another object is to generate set points for the EGR valve and VGT position which correspond to a desired AFR and $F_1$.

A further object is to provide a multivariable control scheme which coordinates the VGT and EGR actuators to achieve the desired set points.

According to the present invention, the foregoing and other objects and advantages are obtained by a method of controlling the airflow into a compression ignition engine having an EGR and a VGT. The method includes the steps of determining the engine speed (N(t)) and fueling rate ($W_f$(t)) and, based on these values, retrieving desired values for the intake manifold pressure ($P_1^*$) and compressor mass flow rate ($W_a^*$). These desired values are then compared against measured values for the intake pressure ($P_1$) and mass airflow ($W_a$) to generating an EGR valve position command ($X_{egr}$(t)) and VGT guide vane position command ($X_{vgt}$(t)) as a function of the weighted sum of the difference between $P_1$ and $P_1^*$, and $W_a$ and $W_a^*$. These values are then applied to the EGR valve and turbocharger turbine guide vanes, respectively, to drive the EGR valve and VGT vanes to the respective desired positions.

The present control method is advantageous in that, by coordinating EGR and VGT control, it achieves VGT and EGR actuator command signals which are smaller that those observed in conventional independent control schemes. Thus, actuator wear is reduced, and actuator saturation is less frequent than in conventional control schemes, reducing the necessity for complex saturation-recovery logic. The present controller is also simple to calibrate and tune, and results in reduced turbo-lag compared to conventional controllers.

Other objects and advantages of the invention will become apparent upon reading the following detailed description and appended claims, and upon reference to the accompanying drawings.

BRIEF DESCRIPTION OF THE DRAWINGS

For a more complete understanding of the invention, reference should be made to the embodiments illustrated in greater detail in the accompanying drawings and described below by way of examples of the invention. In the drawings:

FIG. 2 is a block diagram of an engine control system in accordance with one embodiment of the present invention;

FIG. 3 is a block diagram of one embodiment of the controller of FIG. 2;

FIG. 4 is a logic diagram of the performance DC-gain matrix from the actuator values to the performance variables; and FIG. 5 is a block diagram of another embodiment of the controller of FIG. 2.

DESCRIPTION OF THE PREFERRED EMBODIMENT

Figure 1:
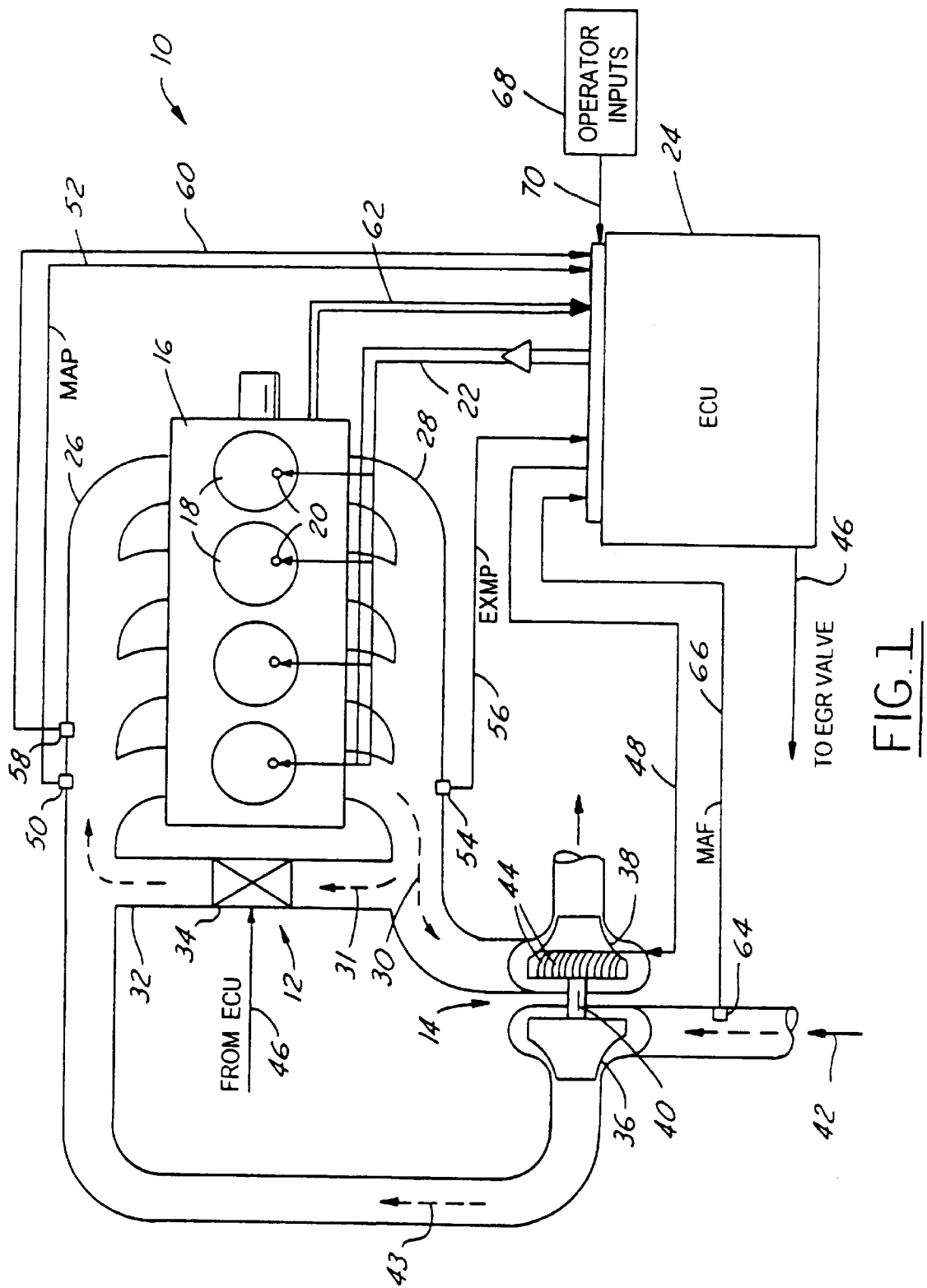
FIG. 1 is a schematic view of a compression ignition engine system having an EGR system and a VGT in accordance with one embodiment of the present invention.

Turning first to FIG. 1, there is shown a simplified schematic diagram of a compression ignition engine system 10 equipped with an exhaust gas recirculation (EGR) system 12 and a variable geometry turbocharger (VGT) 14. A representative engine block 16 is shown having four combustion chambers 18. Each of the combustion chambers 18 includes a direct-injection fuel injector 20. The duty cycle of the fuel injectors 20 is determined by the engine control unit (ECU) 24 and transmitted along signal line 22. Air enters the combustion chambers 18 through the intake manifold 26, and combustion gases are exhausted through the exhaust manifold 28 in the direction of arrow 30.

To reduce the level of NOx emissions, the engine is equipped with an EGR system 12. The EGR system 12 comprises a conduit 32 connecting the exhaust manifold 28 to the intake manifold 26. This allows a portion of the exhaust gases to be circulated from the exhaust manifold 28 to the intake manifold 26 in the direction of arrow 31. An EGR valve 34 reculates the amount of exhaust gas recirculated from the exhaust manifold 28. In the combustion chambers, the recirculated exhaust gas acts as an inert gas, thus lowering the flame and in-cylinder gas temperature and decreasing the formation of NOx. On the other hand, the recirculated exhaust gas displaces fresh air and reduces the air-to-fuel ratio of the in-cylinder mixture.

The turbocharger 14 uses exhaust gas energy to increase the mass of the air charge delivered to the engine combustion chambers 18. The exhaust gas flowing in the direction of arrow 30 drives the turbocharger 14. This larger mass of air can be burned with a larger quantity of fuel, resulting in more torque and power as compared to naturally aspirated, non-turbocharged engines.

The turbocharger 14 consists of a compressor 36 and a turbine 38 coupled by a common shaft 40. The exhaust gas 30 drives the turbine 38 which drives the compressor 36 which, in turn, compresses ambient air 42 and directs it (arrow 43) into the intake manifold 26. The VGT 14 can be modified during engine operation by varying the turbine flow area and the angle at which the exhaust gas 30 is directed at the turbine blades. This is accomplished by changing the angle of the inlet guide vanes 44 on the turbine 38. The optimal position for the inlet guide vanes 44 is determined from the desired engine operating characteristics at various engine speeds.

All of the engine systems, including the EGR 12, VGT 14 and fuel injectors 20 are controlled by the ECU. For example, signal 46 from the ECU 24 regulates the EGR valve position, and signal 48 regulates the position of the VGT guide vanes 44.

In the ECU 24, the command signals 46, 48 to the EGR 12 and VGT 14 actuators are calculated from measured variables and engine operating parameters by means of a control algorithm. Sensors and calibratable lookup tables residing in ECU memory provide the ECU 24 with engine operating information. For example, an intake manifold pressure (MAP) sensor 50 provides a signal ($P_1$) 52 to the ECU indicative of the pressure in the intake manifold 26. Likewise, exhaust manifold pressure (EXMP) sensor 54 provides a signal ($P_2$) 56 to the ECU 24 indicative of the pressure in the exhaust manifold 28. Further, an intake manifold temperature sensor 58 provides a signal ($T_m$) 60 to the ECU 24 indicative of the intake manifold temperature. A mass airflow (MAF) sensor 64 also provides a signal ($W_a$) 66 indicative of the compressor mass airflow to the ECU 24.

Additional sensory inputs can also be received by the ECU along signal line 62 such as engine coolant temperature, engine speed, and throttle position. Additional operator inputs 68 are received along signal 70 such as the accelerator pedal position or other fueling request input.

The engine control methods described herein apply to all turbocharged compression ignition engines equipped with EGR systems, regardless of the type of fuel used. Thus, it is to be understood that references to diesel engines are equally applicable to other compression ignition engines as well. In addition, throughout the specification, the following notations are used in describing measured or calculated variables:

| | |
|---|---|
| N | engine speed (RPM) |
| $P_1$ | intake manifold pressure (MAP) (kPa) |
| $P_2$ | exhaust manifold pressure (EXMP) (kPa) |
| $P_a$ | ambient (barometric) pressure (kPa) |
| $W_a$ | compressor mass flow rate (MAF) (kg/s) |
| $W_{egr}$ | EGR mass flow rate (kg/s) |
| $W_f$ | fuel mass flow rate (kg/h) |
| $F_1^*$ | desired intake burnt gas fraction |
| AFR* | desired air/fuel ratio |
| $AF_s$ | stoichiometric air/fuel ratio (14.6 for diesel fuel) |
| $X_{egr}$ | EGR valve position |
| $X_{vgt}$ | VGT actuator position |

The disclosed engine control method can be implemented in a modular fashion with existing fuel limiting schemes as shown in FIG. 2. Accordingly, the engine control system has four major components: (1) control block 200 generates desired set points for the compressor mass flow rate ($W_a^*$) and intake manifold pressure ($P_1^*$); (2) control block 202 is the feedback controller to achieve the desired set points for $W_a$ and $P_1$; (3) the plant or engine is represented by block 204; and (4) block 206 represents conventional fuel limiting schemes which may include an air density limiter and slew rate limiter. This invention relates primarily to the set point generator 200 and the controller 202, and their implementation in an engine control strategy.

Control block 200 receives as inputs the engine speed (N), requested fueling rate ($W_f$) and generates set points for the compressor flow rate ($W_a^*$) and intake manifold pressure ($P_1^*$) in order to achieve the desired AFR (AFR*) and dilution fraction ($F_1^*$). These desired values are obtained by optimizing the steady-state fuel consumption and emissions based on the engine mapping data. Specifically, a two-dimensional grid of engine speed values and fueling rate values is created. For each grid point, an optimal EGR valve position ($X_{egr}$) and VGT actuator position ($X_{vgt}$) is developed with reference to $F_1$, smoke production, and $P_1$.

The EGR burnt gas fraction ($F_1$) in the intake manifold is calculated as follows:

$$F_1 = W_f((1+1/AF_s)/(W_f+W_a))(W_{egr}/(W_a+W_{egr})) \quad (1)$$

where $AF_s$ is the stoichiometric air/fuel ratio, which equals approximately 1/14.6 for diesel fuel. $W_a$ is measured by MAF sensor 64 of FIG. 1, and $W_{egr}$ can be calculated from measurements of the intake manifold $CO_2$ concentration, exhaust manifold $CO_2$ concentration, and $W_a$. Measurements for $W_f$, $W_a$, smoke, and $CO_2$ concentrations are typically recorded during engine dynamometer testing and mapping, and can be gathered by any known method.

When developing values for $X_{egr}$ and $X_{vgt}$, $F_1$ is preferably maximized for NOx reduction, smoke is preferably kept below an acceptable level, and the intake manifold pressure, $P_1$, is preferably limited to a maximum value for overboost protection and fuel economy.

Alternatively, $X_{egr}$ and $X_{vgt}$ can be developed based on the maximized weighted sum of engine brake torque and $F_1$ at each engine operating point. In such a case, the weights of the summing function are experimentally selected to achieve the desired performance tradeoff between NOx production and fuel consumption.

The optimized values for the performance variables $F_1$ and AFR can be expressed as:

$$z^* = \begin{pmatrix} F_1^* \\ AFR^* \end{pmatrix} = f_z(W_f, N)$$

These values are used in the controller calibration stage to aid in defining optimum values for the measured variables.

The optimized values for the EGR position and VGT position can be expressed as:

$$u^* = \begin{pmatrix} X_{egr}^* \\ X_{vgt}^* \end{pmatrix} = f_u(W_f, N)$$

And the corresponding values of the measured outputs can be expressed as:

$$y^* = \begin{pmatrix} P_1^* \\ W_a^* \end{pmatrix} = f_y(W_f, N)$$

Accordingly, two-dimensional lookup tables are obtained for $z^*$, $u^*$, and $y^*$ at each engine operating point based on the engine speed and fueling rate. If the values of the engine speed or fueling rate do not coincide with one of the grid values, linear interpolation between grid values can be used to obtain the corresponding values for $z^*$, $u^*$, and $y^*$.

Given the desired set points $W_a^*$ and $P_1^*$ from the set point generator 200 which correspond to $z^*$, the feedback controller 202 calculates desired values for the EGR valve position and VGT actuator position to achieve the desired compressor flow rate and intake pressure.

Referring to FIG. 3, at node 312, a compressor flow error term is established which is equal to the difference between the actual (measured) and desired compressor mass flow rates ($W_a - W_a^*$). Similarly, at node 314, an intake pressure error term is generated which is equal to the difference between the actual and desired intake manifold pressures ($P_1 - p_1^*$). The control signals for EGR valve position and VGT actuator position are scheduled based on the optimal combinations of the deviation from the desired compressor mass air flow and intake manifold pressure in box 316. These combinations are optimized based on the performance variables, $F_1$ and AFR, not the measured variables.

The VGT actuator and EGR valve commands are coordinated by identifying the steady-state gains of each actuator at the optimal set points, $X_{egr}$ and $X_{vgt}$. These gains are arranged in a 2×2 DC-gain matrix $P_y$ shown by block 318.

To obtain values for the gain matrix $P_{yij}$, for each fueling rate and engine speed, the EGR valve position and VGT actuator position, $u_j$, are perturbed small amount around the optimal value $u_j^*$ such as within 5% of the value of $u_j^*$ ($\Delta u_j = u_j - u_j^* = 5\% \, u_j^*$). The resulting steady-state difference $\Delta y_i = y_i - y_i^*$ is then measured, and values for the steady-state gain matrix $P_y$ are calculated as follows:

$$P_{yij} = \Delta y_i / \Delta u_j \tag{2}$$

The procedure is repeated for all values of i=1,2 and j=1,2 and for all values of engine speed and fueling rate from the grid. The values of the entries for $P_{yij}$ are stored in ECU memory in a two-dimensional table. Linear interpolation is used to determine values of $P_{yij}$ for engine speed values and fueling rate values that differ from the values of the grid points. Thus, the DC-gain matrix used to convert actuator position deviations for EGR and VGT to steady-state measurement deviations for MAF and MAP yields:

$$\begin{pmatrix} \Delta W_a \\ \Delta P_1 \end{pmatrix} = \begin{pmatrix} P_{y11} & P_{y12} \\ P_{y21} & P_{y22} \end{pmatrix} \begin{pmatrix} \Delta X_{egr} \\ \Delta X_{vgt} \end{pmatrix} \tag{3}$$

or $$\Delta y = P_y \Delta u \tag{4}$$

Where $\Delta W_a$, $\Delta P_1$, $\Delta X_{egr}$, $\Delta X_{vgt}$, $\Delta y$, and $\Delta u$ correspond to deviations of the respective variables from the nominal values.

Similarly, FIG. 4 shows the DC-gain matrix $P_z$ 400 which is developed to define the steady-state gains from the actuator positions for the EGR and VGT to the performance variables $F_1$ and AFR. The values for the matrix $P_z$ are calculated using a formula similar to equation (2): $P_{zij} = \Delta z_i / \Delta u_j$ from the measurements of the steady-state difference $\Delta z_i = z_i - z_i^*$ resulting from the perturbation $\Delta u_j = u_j - u_j^*$. Accordingly, the DC-gain matrix used to convert actuator signals for EGR and VGT to steady-state measurements for the performance variables can be represented as follows:

$$\begin{pmatrix} \Delta F_1 \\ \Delta AFR \end{pmatrix} = \begin{pmatrix} P_{z11} & P_{z12} \\ P_{z21} & P_{z22} \end{pmatrix} \begin{pmatrix} \Delta X_{egr} \\ \Delta X_{vgt} \end{pmatrix} \tag{5}$$

or $$\Delta z = P_z \Delta u \tag{6}$$

Where $\Delta F_1$, $\Delta AFR$, $\Delta X_{egr}$, $\Delta X_{vgt}$, $\Delta z$, and $\Delta u$ correspond to the deviations of the respective variables from the nominal values.

Referring again to FIG. 3, it is apparent that coordination of the EGR valve and VGT actuator requires calibration of all four variables, $c_{11}$, $c_{12}$, $c_{21}$, and $c_{22}$. These variables are calibrated assuming that, at the optimum set points for $F_1$ and AFR, the performance variables are almost dependent. Specifically, increasing $F_1$, decreases AFR and vice versa. As a result, the coordination scheme of box 316 can be simplified to the controller shown in FIG. 5 as box 516. Thus, $P_z$ is decomposed to generate gains $g_1$ and $g_2$ and, rather than using two integrators on two signals, a single integrator and weighted sum is used for the controller implementation. Accordingly, the EGR and VGT are coupled through the gains $g_1$ and $g_2$, and the controller 516 enforces tracking of a weighted sum of the measurement errors through the gains $h_1$ and $h_2$. Preferably, $g_1$, $g_2$, $h_1$ and $h_2$ are selected to maximize the effect of the actuators on AFR and $F_1$ along a given direction. This is done because, in this embodiment, the actuators do not have the authority to manipulate AFR and $F_1$ independently. The gains $g_1$ and $g_2$ are calculated as follows:

if $P_{z11}^2 + P_{z21}^2 < P_{z12}^2 + P_{z22}^2$ then $$\alpha = (1 + |(P_{z11}P_{z12} + P_{z21}P_{z22})/(P_{z12}^2 + P_{z22}^2)|^2)^{1/2}$$

$$g_1 = (1/\alpha)((P_{z11}P_{z12} + P_{z21}P_{z22})/(P_{z12}^2 + P_{z22}^2)) \tag{7}$$

$$g_2 = (1/\alpha) \tag{8}$$

else $$\alpha = (1 + |(P_{z11}P_{z12} + P_{z21}P_{z22})/(P_{z11}^2 + P_{z21}^2)|^2)^{1/2}$$

$$g_1 = (1/\alpha) \tag{9}$$

$$g_2=(1/\alpha)((P_{z11}P_{z12}+P_{z21}P_{z22})/(P_{z11}^2+P_{z21}^2)) \qquad (10)$$

The gains $h_1$ and $h_2$ are calculated as follows:

let $e_1=P_{z11}g_1+P_{z12}g_2$ $e_2=P_{z21}g_1+P_{z22}g_2$ and $DTP_y=P_{y11}P_{y22}-P_{y12}P_{y21}$ then values for $h_1$ and $h_2$ can be defined in terms of $\underline{h_1}$ and $\underline{h_2}$:

$$\underline{h_1}=(1/DTP_y)[e_1(P_{z11}P_{y22}-P_{z12}P_{y21})+e_2(P_{z21}P_{y22}-P_{z22}P_{y21})]$$

$$\underline{h_2}=(1/DTP_y)[e_1(-P_{z11}P_{y12}+P_{z12}P_{y11})+e_2(-P_{z21}P_{y12}+Pz_{22}P_{y11})]$$

resulting in:

$$h_1=\underline{h_1}/(\underline{h_1}^2+\underline{h_2}^2)^{1/2} \qquad (11)$$

$$h_2=\underline{h_2}/(\underline{h_1}^2+\underline{h_2}^2)^{1/2} \qquad (12)$$

The gains $g_1$, $g_2$, $h_1$, and $h_2$ are stored in lookup tables in ECU memory and are used to gain-schedule the controller across the entire engine operating range. The controller box 502 in FIG. 5 is implemented using a proportional ($k_p$) plus integral ($k_i$) controller and is adjusted to meet the desired transient characteristics of the engine response based on the EGR valve and VGT actuator characteristics. Thus, $k_p$ and $k_i$ are constant values for all engine operating states whereas $g_1$, $g_2$, $h_1$, and $h_2$ vary based on the engine operating state because of $P_z$ and $P_y$. Alternatively, $k_p$ and $k_i$ could be replaced by any dynamic controller which provides a zero steady-state error.

In order to implement the controller scheme in the digital ECU, for each time instant (t), the weighted sum of the measurement errors $h_1$ and $h_2$, is used to generate position commands for the EGR valve and VGT actuator as follows:

$$X_c(t+1)=X_c(t)+\delta t[h_1(W_a-W_a^*)+h_2(P_1+P_1^*)] \qquad (13)$$

$$X_{egr}(t)=X_{egr}^*(t)+g_1(k_iX_c(t)+k_ph_1((W_a-W_a^*)+h_2(P_1-P_1^*))) \qquad (14)$$

$$X_{vgt}(t)=X_{vgt}^*(t)+g_2(k_iX_c(t)+k_ph_1((W_a-W_a^*)+h_2(P_1-P_1^*))) \qquad (15)$$

Where $X_c(t)$ is the integrator state of the proportional plus integral controller. These commanded values are then applied to the actuator drivers of the ECR and VGT along signal lines 46 and 48, respectively of FIG. 1.

While the invention has been described in connection with one or more embodiments, it will be understood that the invention is not limited to those embodiments. For example, instead of measuring the compressor mass airflow ($W_a$), it can be estimated from the measured intake and exhaust manifold pressures and intake manifold temperature signals. The structure of the control algorithm would remain the same, except that an estimate of the compressor mass airflow is used instead of its measured value. Accordingly, the invention covers all alternatives, modifications, and equivalents, as may be included within the spirit and scope of the appended claims.

What is claimed is:

1. A method of controlling the air-fuel ratio and burnt gas fraction in a compression ignition engine having an EGR system including a valve connecting an intake manifold and exhaust manifold of the engine, and a variable geometry turbocharger including a compressor connected to a turbine having guide vanes, the compressor in communication with the intake manifold and the turbine guide vanes in communication with the exhaust manifold, the method comprising the steps of:

determining an engine speed value (N(t)) indicative of the current engine speed;

determining a fueling rate value ($W_F(t)$) to be injected as a function of N(t) and the operator-requested fueling rate;

retrieving desired values for the intake manifold pressure ($P_1^*$) and compressor mass flow rate ($W_a^*$) from a table of values indexed by $W_F(t)$ and N(t) said table of values corresponding to desired values for the air-fuel ratio and burnt gas fraction at each value of $W_F(t)$ and N(t);

determining an intake pressure value ($P_1$) indicative of the intake manifold pressure;

determining a mass airflow value ($W_a$) indicative of the compressor mass flow rate;

generating an EGR valve position command ($X_{egr}(t)$) and VGT guide vane position command ($X_{vgt}(t)$) as a function of the weighted sum of the difference between $P_1$ and $P_1^*$, and the difference between $W_a$ and $W_a^*$; and applying $X_{egr}(t)$ and $X_{vgt}(t)$ to the EGR valve and turbine guide vanes, respectively, to drive the EGR valve and turbine guide vanes to the respective desired values.

2. The method as set forth in claim 1 wherein the step of generating an EGR valve position command ($X_{egr}(t)$) and VGT guide vane position command ($X_{vgt}(t)$) includes the step of generating $X_{egr}(t)$ and $X_{vgt}(t)$ with a single dynamic controller.

3. The method as set forth in claim 2 wherein said single dynamic controller comprises a proportional plus integral feedback controller.

4. The method as set forth in claim 3 wherein the step of generating an EGR valve position command ($X_{egr}(t)$) and VGT guide vane position command ($X_{vgt}(t)$) includes the step of calculating $X_{egr}(t)$ according to the following equation:

$$X_{egr}(t)=X_{egr}^*(t)+g_1(k_iX_c(t)+k_ph_1((W_a-W_a^*)+h_2(P_1-P_1^*)))$$

and calculating $X_{vgt}(t)$ according to the following equation:

$$X_{vgt}(t)=X_{vgt}^*(t)+g_2(k_iX_c(t)+k_ph_1((W_a-W_a^*)+h_2(P_1-P_1^*)))$$

wherein $g_1$, $g_2$, $h_1$, and $h_2$ are gain values stored in a table of values indexed by $W_F(t)$ and N(t), $k_i$ represents the integral feedback controller gain, $k_p$ represents the proportional feedback controller gain, $X_{egr}^*(t)$ and $X_{vgt}^*(t)$ represent the desired values for the EGR valve position and VGT turbine position, respectively, corresponding to the desired values for the air-fuel ratio and burnt gas fraction at each value of $W_F(t)$ and N(t), and $X_c(t)$ is the integrator state of the feedback controller.

5. The method as set forth in claim 1 wherein the step of determining a mass airflow value ($W_a$) includes the step of measuring the mass airflow with a mass airflow sensor.

6. The method as set forth in claim 1 wherein the step of determining a mass airflow value ($W_a$) includes the step of estimating the mass airflow as a function of the intake manifold pressure, exhaust manifold pressure, and intake manifold temperature.

7. A compression ignition engine system comprising:

an exhaust gas recirculation (EGR) passage including an EGR valve connecting an intake manifold and exhaust manifold of the engine, said EGR valve responsive to an EGR valve control signal for regulating the amount of exhaust gas flowing into said intake manifold;

a variable geometry turbocharger (VGT) including a compressor connected to a turbine, the compressor in communication with the intake manifold and the turbine in communication with the exhaust manifold, said turbine responsive to a Turbocharger signal for regulating the intake manifold pressure;

a mass airflow sensor located upstream of said compressor for providing a compressor mass airflow signal ($W_a$);

an intake manifold pressure sensor located in said intake manifold for providing an intake manifold pressure signal ($P_1$);

an engine control unit including memory and a dynamic controller, said memory including a table of desired intake manifold pressure values ($P_1^*$) and desired compressor flow values ($W_a^*$) indexed by engine speed and fueling rate said table of values corresponding to desired values for the air-fuel ratio and burnt gas fraction at each value of the requested engine fueling rate and engine speed, said dynamic controller adapted to receive as inputs said intake manifold pressure signal and said mass airflow signal and transmit as outputs said EGR valve control signal and said turbocharger signal as a function of the weighted sum of the differences between $P_1$ and $P_1^*$, and between $W_a$ and $W_a^*$.

8. The compression ignition engine system of claim 7 wherein said dynamic controller comprises a proportional plus integral controller.

9. In a compression ignition engine system having an exhaust gas recirculation (EGR) passage including an EGR valve connecting an intake manifold and exhaust manifold of the engine, said EGR valve responsive to an EGR valve control signal for regulating the flow of exhaust gas into said intake manifold, and a variable geometry turbocharger (VGT) including a compressor connected to a turbine, the compressor in communication with the intake manifold and the turbine in communication with the exhaust manifold, said turbine responsive to a turbocharger signal for regulating the intake manifold pressure, an engine control unit for regulating the airflow into said engine, said engine control unit comprising:

memory for storing feedback gains and desired engine operating values; and a feedback controller for generating said EGR valve control signal and said turbocharger signal, said feedback controller programmed to:

retrieve from said memory a desired intake manifold pressure value ($P_1^*$) and a desired compressor flow rate ($W_a^*$) said $P_1^*$ and $W_a^*$ corresponding to desired values for the air-fuel ratio and burnt gas fraction at each value of the requested engine fueling rate ($W_f(t)$) and engine speed ($N(t)$);

receive a pressure signal ($P_1$) indicative of the actual intake manifold pressure;

receive a compressor flow value ($W_a$) indicative of the actual compressor flow rate;

determine controller weights $g_1$, $g_2$, $h_1$, and $h_2$;

determine proportional and integral feedback gains $k_p$ and $k_i$;

generate said EGR valve control signal ($X_{egr}$) and said turbocharger signal ($X_{vgt}$) as a function of $g_1$, $g_2$, $h_1$, $h_2$, $P_1^*$, $P_1$, $W_a$, $W_a^*$, $k_p$ and $k_i$ and transmit $X_{egr}$ to said EGR valve to regulate the compressor flow rate; and transmit $X_{vgt}$ to said turbocharger turbine to regulate the intake manifold pressure.

10. The compression ignition engine system of claim 9 wherein said EGR valve control signal ($X_{egr}$) is generated according to the following equation:

$$X_{egr}(t)=X_{egr}^*(t)+g_1(k_i X_c(t)+k_p h_1((W_a-W_a^*)+h_2(P_1-P_1^*)))$$

and said turbocharger signal $X_{vgt}(t)$ is generated according to the following equation:

$$X_{vgt}(t)=X_{vgt}^*(t)+g_2(k_i X_c(t)+k_p h_1((W_a-W_a^*)+h_2(P_1-P_1^*)))$$

wherein $g_1$, $g_2$, $h_1$, and $h_2$ are gain values stored in a table of values indexed by $W_F(t)$ and $N(t)$, $k_i$ represents the integral feedback controller gain, $k_p$ represents the proportional feedback controller gain, $X_{egr}(t)$ and $X_{vgt}^*(t)$ represent the desired values for the EGR valve position and VGT turbine position, respectively, corresponding to the desired values for the air-fuel ratio and burnt gas fraction at each value of $W_F(t)$ and $N(t)$, and $X_c(t)$ is the integrator state of the feedback controller.

* * * * *